United States Patent [19]
Baird et al.

[11] Patent Number: 6,115,603
[45] Date of Patent: Sep. 5, 2000

[54] CLASS IN-BAND SERVICE DELIVERY OVER FIXED WIRELESS ACCESS COMMUNICATION SYSTEMS

[75] Inventors: Anthony John Baird, Torquay; William James Parton, London; Paul Barnard, Newton Abbot, all of United Kingdom

[73] Assignee: Nortel Networks Corporation, Montreal, Canada

[21] Appl. No.: 08/919,985

[22] Filed: Aug. 28, 1997

[30] Foreign Application Priority Data

Jul. 18, 1997 [GB] United Kingdom ............... 971514

[51] Int. Cl.⁷ ............... H04M 3/42; H04B 1/38
[52] U.S. Cl. ............... 455/414; 379/201; 379/230; 370/336; 370/522; 455/561
[58] Field of Search ............... 455/414, 415, 455/417, 458, 515, 554, 560, 561; 379/142, 215, 216, 201, 229, 220; 370/384, 385, 438, 522, 524, 336, 328, 329

[56] References Cited

U.S. PATENT DOCUMENTS

| | | | |
|---|---|---|---|
| 4,551,581 | 11/1985 | Doughty | 379/93.14 |
| 4,884,269 | 11/1989 | Duncanson et al. | 370/251 |
| 5,363,429 | 11/1994 | Fujisawa | 455/415 |
| 5,444,713 | 8/1995 | Backaus et al. | 370/524 |
| 5,446,731 | 8/1995 | Lee | 370/377 |
| 5,557,605 | 9/1996 | Grube et al. | 455/415 |
| 5,588,009 | 12/1996 | Will | 371/33 |
| 5,604,789 | 2/1997 | Lerman | 455/454 |
| 5,703,934 | 12/1997 | Zicker et al. | 371/61 |
| 5,752,195 | 5/1998 | Tsuji et al. | 455/462 |
| 5,761,278 | 6/1998 | Pickett et al. | 379/90.01 |
| 5,802,145 | 9/1998 | Farris et al. | 379/34 |
| 5,812,639 | 9/1998 | Bartholomew | 379/89 |
| 5,835,584 | 11/1998 | Penttonen | 379/230 |
| 5,841,853 | 11/1998 | Yamanishi et al. | 379/215 |
| 5,857,016 | 1/1999 | Jedlicka | 379/142 |
| 5,953,399 | 9/1999 | Farris et al. | 379/201 |
| 5,953,675 | 9/1999 | Rabina et al. | 455/557 |

*Primary Examiner*—Reinhard J. Eisenzopf
*Assistant Examiner*—Charles N. Appiah
*Attorney, Agent, or Firm*—Baker Botts L.L.P.

[57] ABSTRACT

A signaling path between a central office switch and a fixed radio access network terminal equipment supporting one or a plurality of subscriber handsets comprises a radio base station connection to the central office switch via a back haul transmission link, and communicates with the network terminal equipment via a wireless link operating in accordance with an air interface protocol e.g. such as described in International Standard Q931. In band service signals, e.g. of the Custom Local Area Special Services (CLASS) type, are issued by the central office switch on an in voice band channel and are stored at the radio base station whilst A party to B party call set up is effected over a digital signal path between the central office switch and the network terminal equipment. Out of band digital call set up signals and in band signals are multiplexed at the radio base station prior to transmission over digital channel of the air interface, thereby allowing call set up to occur before transmission of CLASS service signals to a subscriber handset.

8 Claims, 7 Drawing Sheets

CLASS IN-BAND SERVICE DELIVERY OVER FIXED WIRELESS ACCESS COMMUNICATION SYSTEMS

FIELD OF THE INVENTION

The present invention relates to provision of central office switch services via in-voice band signals over a fixed wireless access system.

BACKGROUND TO THE INVENTION

In conventional analog plain old telephone service (POTS) telecommunications systems, it is known to provide to domestic and business users a set of services known as Custom Local Area Special Services (CLASS), whereby a subscriber can access or control functionality provided by a central office switch for obtaining information or for configuring a subscriber line. CLASS services emulate services known as "network services" often provided on a conventional PBX. In some cases these are accessed by a subscriber dialing pre-defined key sequences on his or her telephone handset. In other cases such services are bought services which are automatically generated by a service provider. Examples of such services include:

calling line identification—a facility by which a subscriber can identify a phone number of an incoming call.

Integrated voice mail—where a CLASS feature is used to provide an indication of voice mail waiting.

Such services are specified in ITU international standard V5.2 (International Telecommunications Union ITU-T Recommendation V5.2, available from ITU Sales and Marketing Service, Place de Nations, CH-1211 Geneva 20, Switzerland, E-Mail Sales@itu.com). Various types of central office switches produced by different manufacturers may also support different selections of CLASS services, the selections differing from proprietor to proprietor. For example, Nortel Limited (Northern Telecom) specify proprietary CLASS services in their DMS-X specification, which are supported by Nortel DMS type switches available from Nortel Limited (Northern Telecom).

Referring to FIG. 1 herein, there is illustrated a prior art central office switch 100 comprising part of a prior art broad band network, the switch communicating with an item of customer premises equipment 101, over a hard wired transmission line 102, for example a coaxial cable or twisted copper wire pair, the customer premises equipment supporting a plurality of analog terminal equipment 103, e.g. subscriber handsets. Between each subscriber handset and the central office switch there exists a subscriber line 105 comprising a voice band channel which operates to carry voice or modem traffic, typically within a band of 300 Hz to 3400 Hz, and an out of voice band signaling channel which carries call set up signals, typically in the range 3800 Hz to 4200 Hz. The transmission line 102 supports a large number of such subscriber lines between the central office switch 100 and the plurality of subscriber handsets 103. Between the corresponding subscriber handsets 103 and the customer premises equipment 101, each subscriber line comprises an analog channel which carries voice band data, and a digital channel which carries out of voice band signaling data. Between the central office switch and the customer premises equipment, the analog data, e.g. voice and/or modem traffic, is digitally encoded by the central office switch and is sent down a multiplexed digital link of the transmission line 102 so producing a virtual analog data channel, for carrying in band voice/modem data. On reaching the customer premises equipment the voice band data is sent over an analog channel to the subscriber handset 103. Thus, for each subscriber line between central office switch and subscriber handset there exists an in voice band analog data channel and aft out of voice band signaling channel.

In the following example, operation of CLASS signals giving caller number identification will be given. To connect a call between an A party caller 104 having first telephone number 01803 682784 and a B party 103 having second telephone number 0171 380 2992 over a subscriber line, the B party subscriber handset receives digital call setup signals over an out of voice band digital signaling channel of a subscriber line. An associated voice band channel, over the same subscriber line carries voice and/or modem traffic once call set up has been established. Communication between the central office switch and the customer premises equipment on transmission line 102 is represented schematically in FIG. 2 herein and comprises a serial burst of messaging commands in accordance with a standard protocol, e.g. V5.2 or a proprietary protocol for example DMS-X. In a first time slot 200, the messaging commands operate to provide to the customer premises equipment 101 information describing in which time slots of a plurality of time slots 201, information corresponding to a voice band channel of the subscriber line is to be carried. For example, the V5.2 or DMS-X protocols may specify that in voice band data corresponding to a subscriber line telephone number 0183 682784 is being carried in a particular time slot within the plurality of time slots.

The customer premises equipment interprets this message and proceeds to ring the connected subscriber telephone handset corresponding to number 0171 380 2992, and generates ringing tone signals at the particular subscriber telephone, connecting the voice band signals of the specified time slots to the handset of that number over the corresponding analog channel.

The conventional set of CLASS services make use of the parallel voice band channel between the central office switch 100 and the customer premises equipment 101 immediately after call set up. Whilst the central office switch 100 and the customer premises equipment 101 are making a connection using the out of band digital channel between the central office switch and the network access equipment and ringing a subscriber telephone handset, CLASS services are sent contained in modem bursts in band via the voice band channel. Signals representing calling line identification, and other CLASS services are sent in band along the voice channel to the customer premises apparatus whilst the subscriber handset is ringing, and before A party to B party connection is made. CLASS signals are sent from the customer premises equipment 101 to the subscriber analog telephone handset 103 before, during or after an A party to B party connection is set up. Typically, the analog user handset may indicate to a user that a service is available, e.g. calling line identification by a flashing light at the user handset.

As shown in FIG. 3 herein, CLASS services may be forwarded by the customer premises equipment to the analog subscriber handset, in band in analog format in intervals between bursts of analog ring tone signals. For example, in FIG. 3, between analog ring tone signals 301, there are modem bursts carrying CLASS signals 303, e.g. a signal containing information that a calling line's identification number is 0183 682784. The modem burst is decoded by the analog handset and may be used to generate a liquid crystal display of caller number at the handset. By the above mechanism, CLASS services, similar to those provided in conventional digital handsets over hard wired transmission lines may be made available to CLASS compatible analog handsets.

Large amounts of legacy access networks exist where central office switches are connected with access network apparatus by such hard wiring, e.g. coaxial cable, or twisted wire pairs. However, deployment of such an access network is expensive, due to the installation of the hard wiring cables between the customer premises and the domestic or business premises. Typically, such hard wiring is carried on overhead telegraph poles, or in underground trenches or conduits. Trenching costs for installation of new hard wiring may typically be of the order of $100 per meter, and installation of new hard wiring may involve considerable disruption in a neighborhood. As an alternative to hard wiring between the access network apparatus and domestic/business premises, it is known to install a fixed wireless access (FWA) system (otherwise known as fixed radio access FRA or wireless local loop WLL) in which the central office apparatus communicates with network terminal equipment at subscriber premises via a wireless link. As illustrated schematically in FIG. 4 herein, a network terminal equipment radio transceiver 400 at a subscriber's premises communicates with a radio base station 401 which provides cellular coverage over typically a 5 to 20 kilometre radius in urban environments. The wireless link typically operates at a 3.5 GHz centred frequency band. Each base station is connected to a central office switch via a back haul link comprising a conventional hard wired transmission link, microwave link or fibre optic cable link.

However, whilst the fixed wireless access link provides a cost effective replacement for hard wiring in the access network, the conventional fixed wireless access link does not provide support for CLASS services.

SUMMARY OF THE INVENTION

One object of the present invention is to provide a means of enabling provision of Custom Local Area Special Services (CLASS) type services over a fixed wireless access link.

Ideally, the specific implementations according to the present invention enable existing conventional central office switches to communicate CLASS type services with existing analog subscriber handsets without modification to either central office switch or subscriber handset.

Signals originating at a central office switch may comprise service signals which are to arrive at a subscriber equipment in an analog voice band channel of a subscriber line, and call set up signals which arrive at the subscriber equipment in a digital out of voice band channel.

According to one aspect of the present invention there is provided in a telecommunications network, a method of providing services carried in a voice band channel of a subscriber line, the method comprising the steps of:

receiving service signals describing the services on a the voice band channel;

receiving a call set up signal on a digital channel;

transmitting the call set up signal over a wireless link;

delaying the service signals for a delay period; and transmitting the service signals over the wireless link after the delay period.

The invention includes in a radio base station apparatus of a fixed wireless access telecommunications system, a method of delivering services carried in a voice band channel of a subscriber line, the method comprising the steps of:

detecting a call set up signal received on a digital path of the subscriber line;

transmitting the call set up signals over a digital channel of a wireless link of the subscriber line;

receiving a set of service signals on the voice band channel of the subscriber line;

storing the service signals at the base station; and after a delay period, transmitting the service signals over the wireless link of the subscriber line.

The delay period may comprise a predetermined delay period.

According to a second aspect of the present invention there is provided in a fixed wireless access radio base station of a telecommunication system, a method of delivering service signals carried in a voice band channel of a subscriber line, the method comprising the steps of:

receiving a digital call set up signal over an out of voice band digital path of the subscriber line;

receiving the service signals over a voice band path of the subscriber line;

transmitting the digital call set up signals and the service signals over a digital channel of a fixed wireless access link of the subscriber line.

The digital call set up signals may be multiplexed with the service signals to produce a multiplexed signal. The multiplexed signal may be transmitted over the digital channel of the wireless link.

The invention includes in a fixed wireless access network terminal apparatus, a method of supplying service signals carried in a voice band channel of a subscriber line, the method comprising the steps of:

receiving a digitized signal over a digital channel of a fixed wireless access link, the digitized signal comprising a digital call set up signal and a digitized service signal;

transmitting the digital call set up signal along a digital channel of the subscriber line;

converting the digitized service signal to analog format; and transmitting the analog service signal over an analog channel of the subscriber line.

Preferably the step of transmitting the service signal over the analog channel comprises transmitting the service signal within a voice band.

The step of converting the digitized service signal to analog format may comprise re-modulating the service signal as a frequency shift keyed signal.

The invention includes a fixed wireless access network terminal apparatus, comprising:

transceiver means capable of receiving a digital signal comprising a call set up signal and a digitized service signal;

a digital to analog converter capable of converting the digitized service signal to analog service signal format; and transmission means for transmitting the analog service signal in a voice band of an analog channel of a subscriber line.

The invention includes a fixed wireless access radio base station apparatus comprising:

transceiver means capable of receiving a digital signal comprising a call set up signal and a digitized service signal and capable of transmitting the call set up signals and the service signals over a wireless link; and data storage means capable of storing the digitized service signals wherein the data storage means operates to store the service signals prior to transmission of the service signals over the fixed wireless access link.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best modes contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

In this specification, the terms "voice band path" and "voice band channel" herein are used in relation to signal transmissions between central office switch 500, base station 504 and subscriber transceiver 503 to mean a path or channel allocated for transmission of voice band signals destined for receipt in analog form within voice band at an analog subscriber apparatus. Typically but not exclusively such signals may originate in the range 300 Hz to 3400 Hz, and may comprise analog data which has been converted to digitally encoded format and which may be sent along a multiplexed digital link.

Similarly, the terms "out of band path" and "out of band channel" when used in relation to signal transmissions between central office switch 500, base station 504 and subscriber transceiver 503 are used herein to mean a digital channel allocated for transmission of signals destined for receipt out of voice band at an analog subscriber apparatus. Typically such signaling data may originate in the range 3800 Hz to 4200 Hz, although the invention is not limited to such a range.

The term "voice band" as used herein, means a set of frequencies in the normal human audio range and as used conventionally to carry audio signals in a subscriber line of a telecommunications system. Typically, a voice band extends over a frequency bandwidth of around 3300 Hz, and typically in the range 300 Hz to 3600 Hz, and the terms "in band" and "in voice band" are construed as signals occupying a voice band. The term "out of band" will be construed accordingly as being signals outside the voice band.

In this specification, the term "subscriber line" is used to mean a communications channel connecting a central office switch to an item of subscriber apparatus capable of receiving analog signals. Typically but not exclusively such an item of subscriber apparatus may comprise a telephone handset or a facsimile machine.

Figure 5:
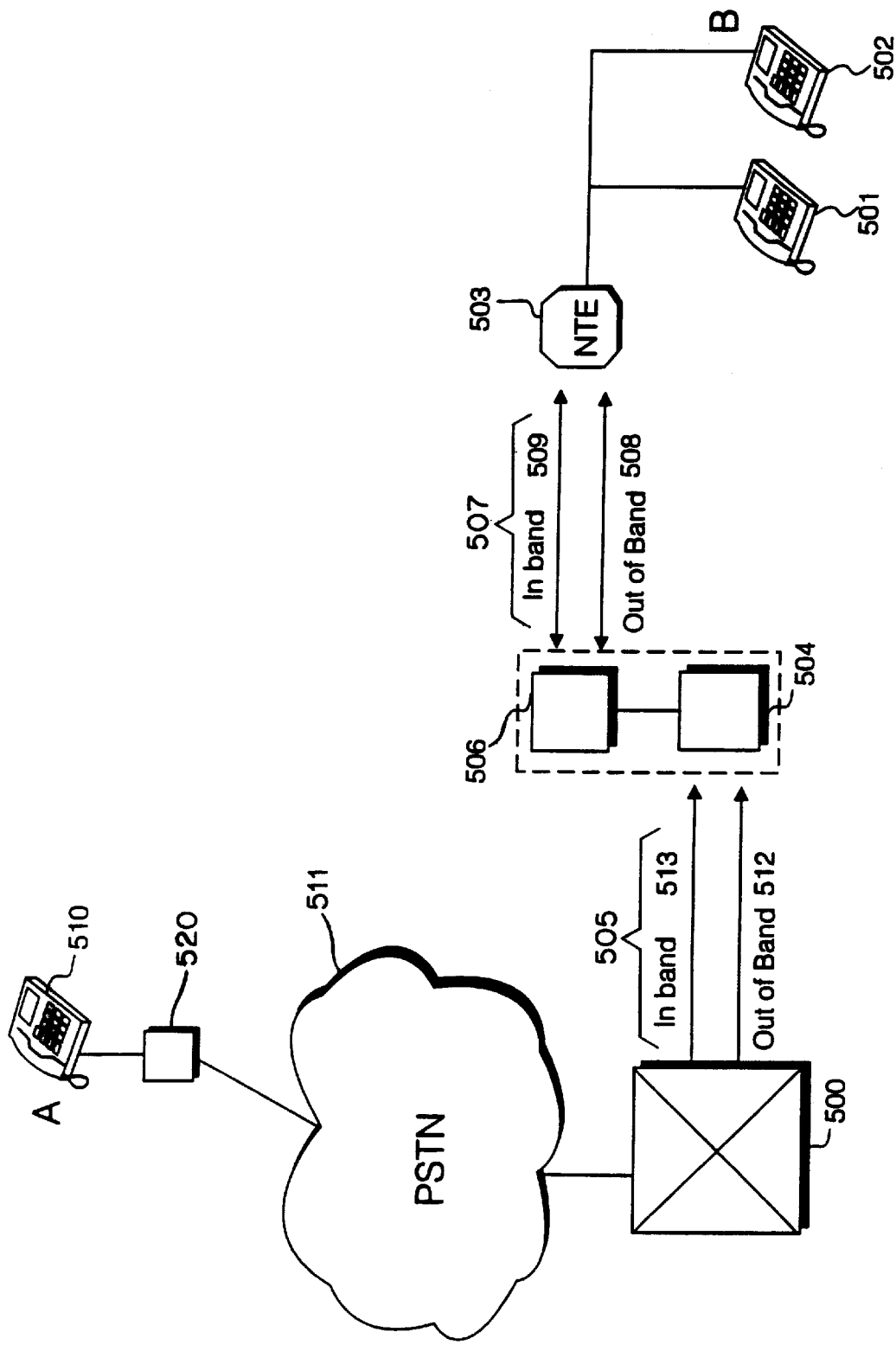
FIG. 5 illustrates schematically a signal path between a central office switch and a network terminal apparatus including a fixed access wireless link in general form.

Referring to FIG. 5 herein, there is illustrated by way of example a signal path of a subscriber line between a conventional central office switch 500 and a network terminal equipment 503 comprising a subscriber transceiver which serves a plurality of conventional analog subscriber telephone handsets 501, 502. The signal path comprises a radio base station 504, the base station communicating with the central office switch via a back haul transmission link 505, the back haul transmission link comprising for example a hardwired copper line, a permanent microwave link or an optical fiber cable; the base station 504 being provided with a transceiver and antenna arrangement 506 communicating with a plurality of said network terminal equipment, each serving one or a plurality of subscriber handsets. Typically, each base station may communicate with a plurality of subscriber transceivers, over a plurality corresponding respective wireless transmission links 507, the transmission links being in a frequency band centered abut 3.5 GHz, and having a range of up to 20 kilometers.

Figure 1:
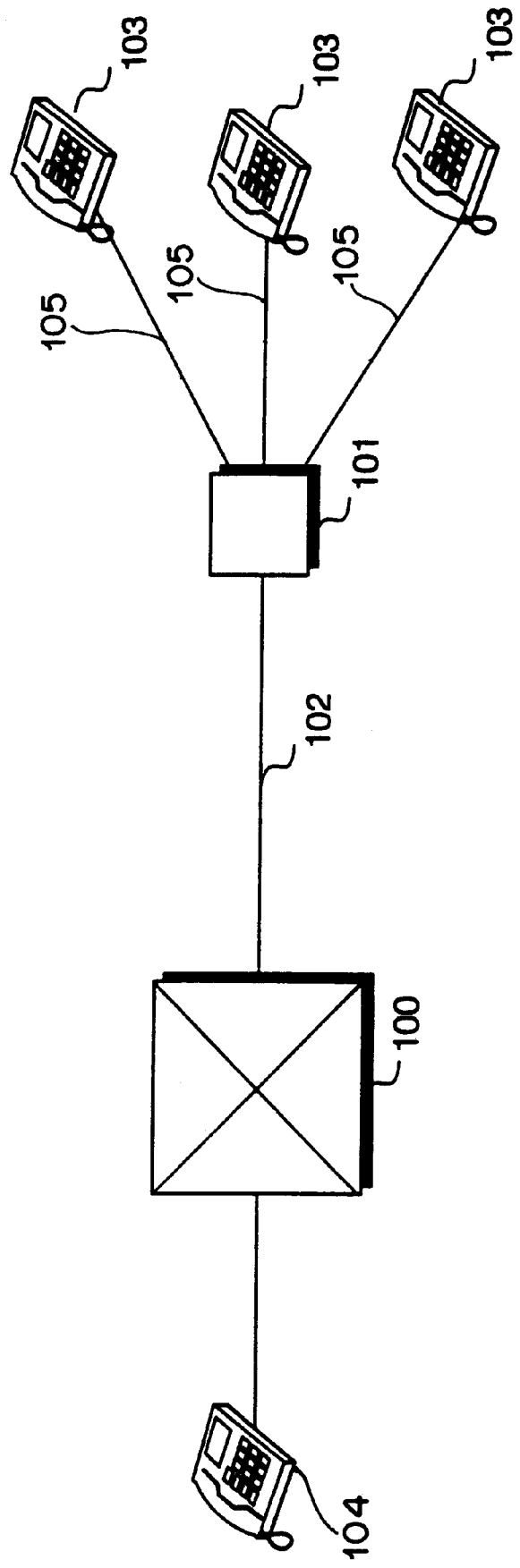
Figure 2:
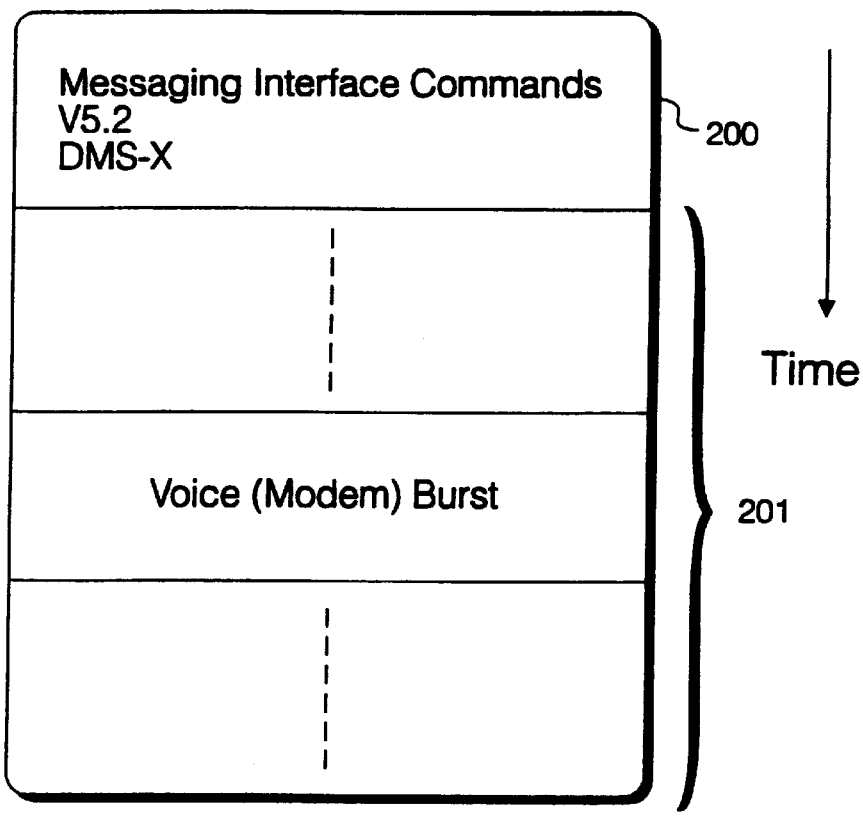
Figure 3:
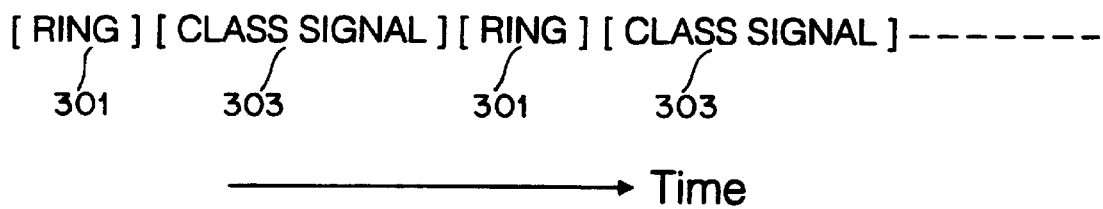
Figure 4:
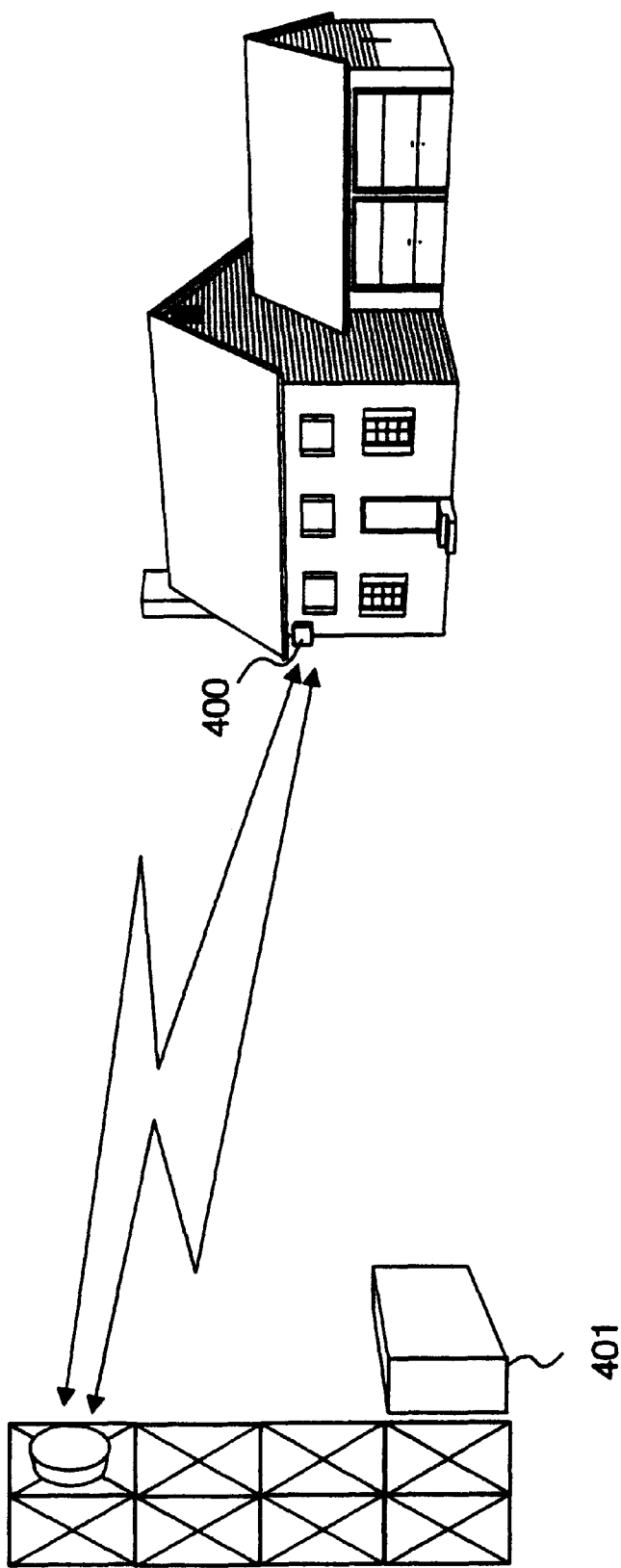

Base station 504 incorporates a conventional messaging interface supporting CLASS services, according to a conventional protocol, e.g. V5.2 or DMS-X protocols. The base station transceiver and antenna arrangement 506 communicates with the plurality of network terminal equipment 501, 502 using an air interface protocol, such as digital air interface protocol Q931. Signal path comprising the back haul transmission link 505, and the base station 504, replaces the hard wired transmission line 102 and wireless transmission link 507 and subscriber transceiver 503 replaces the hard wire cable between the customer premises equipment 101 and telephone handsets 103 of the prior art hard wired system shown in FIG. 1 herein.

Each subscriber line between the central office switch and the network terminal equipment comprises an out of band signaling path and a voice band data path along its whole length. A voice band path of a subscriber line ending at a subscriber handset 501 comprises a voice band data channel 513 between central office switch and the base station; a wireless voice band data channel 509 between radio base station 504 and network terminal equipment 503 and a voice band channel between network terminal equipment 503 and subscriber handset 501. An out of band path of the subscriber line comprises an out of band data channel 512 between central office switch 500 and radio base station 504; a wireless out of band data channel between radio base station 504 and network terminal equipment 503; and an out of band channel between network terminal equipment 503 and subscriber handset 501. In practice, the digital signaling channel 512 and the voice band channel 513 may be different elements of a same multiplexed signal channel, e.g. a TDMA or CDMA signal, and similarly digital signaling channel 508 and voice band channel 509 may be different elements of a same multiplexed signal channel.

However, there is a timing problem preventing incorporation of in-band type CLASS services to analog handsets over the fixed wireless access system as will be described by the following example:

Referring to FIG. 5 herein, on creation of an A party to B party connection, for example between an A party subscriber handset 510 connected to customer premises equipment 520 across a public switched telephone network 511 including central office switch 500 to a B party, e.g. subscriber handset 502, call set up is effected over the out of band signaling path as follows. Central office 500 sends a digital call set up signal over out of band digital channel 512 of back haul transmission line 505, and sends CLASS service signals within voice band time slots over back haul transmission line 505. The call set up signals and CLASS service signals are transmitted by the central office switch 500 substantially simultaneously. The digital call set up signals and in band CLASS service signals arrive at base station 504 substantially simultaneously. Thus, the digital call set up signals arrive at base station 504 with approximately the same time relationship compared to the in band CLASS signals, as they were transmitted from the central office switch 500. On arrival at the base station 504, the out of band call set up signaling and the in-band service signals are retransmitted by transceiver antenna arrangement 506 across wireless link 507 to network terminal apparatus 503. The wireless link 507 supports both in band voice/modem data and out of band call set up data over corresponding in band channel 508 and out of band channel 509 respectively. The wireless digital link 507 uses a re-transmission process embedded in the air interface protocol (e.g. Q931) to ensure reliability and the wireless link 507 has characteristics of incurring high delay. Signals transmitted over the wireless link are acknowledged by network terminal equipment 503 on their receipt. If an error occurs and acknowledgment is insufficient or absent, base station 504 retransmits the signals. However, a disadvantage of this handshaking procedure is that there can be a significant delay in transmission over the wireless link, which may be of indeterminate duration depending upon whether errors occur in the wireless transmission or not. The transmission delay over the wireless link 507 may be of the order of tens of milliseconds, up to in a very bad case, of the order of 5 or 6 seconds. Thus, CLASS service signals transmitted by the central office switch 500 on the voice band path simultaneously with digital call set up signals on the out of band path cannot be guaranteed to arrive at the network terminal apparatus 503 within a short time of their transmission, due to the indeterminate, and potentially long delay incurred by the wireless link digital channel. Since the in band path between the subscriber transceiver 503 and a network terminal equipment, e.g. subscriber handset 501 cannot be established until the appropriate network terminal equipment has responded to call set up signaling, this causes a problem for implementation of in band CLASS services transmitted on the in band channel, because CLASS service signals may arrive at the base station 504 before call set up has been achieved through signaling on the wireless link 507. Under these circumstances, CLASS service signals arriving at base station 504 cannot be forwarded to the network terminal equipment 503 because call set up has not yet been achieved. The call set up process overlaps the CLASS service signaling, with the result that CLASS service signals are lost at the base station 504 without arriving at the network terminal equipment 503.

According to a specific implementation of the present invention, a radio base station 504, on receipt of digital call set up signals and in band CLASS service signals from central office switch 500 converts the in band CLASS service signals to digital format suitable for local storage at the radio base station, and for multiplexing, and multiplexes the digitized in band CLASS service signals with the digital call set up signals and transmits the multiplexed signal over the air interface (Q931) wireless link. Because the in band CLASS service signals are time division multiplexed with the digital call set up signal prior to transmission to the network terminal equipment 503, the in band CLASS service signals arrive with the call set up signals at the network terminal equipment 503 in a timing relationship substantially preserved from their original relationship as transmitted from central office switch 500. Network terminal 503 de-multiplexes the received multiplexed signal and a digital to analog converter at the network terminal equipment converts the digitized in band CLASS service signal to analog format, the converted analog in band CLASS service signal being sent to the subscriber telephone handset in analog format. The specific implementation requires modification of the radio base station 504 and each network terminal equipment 503.

Figure 6:
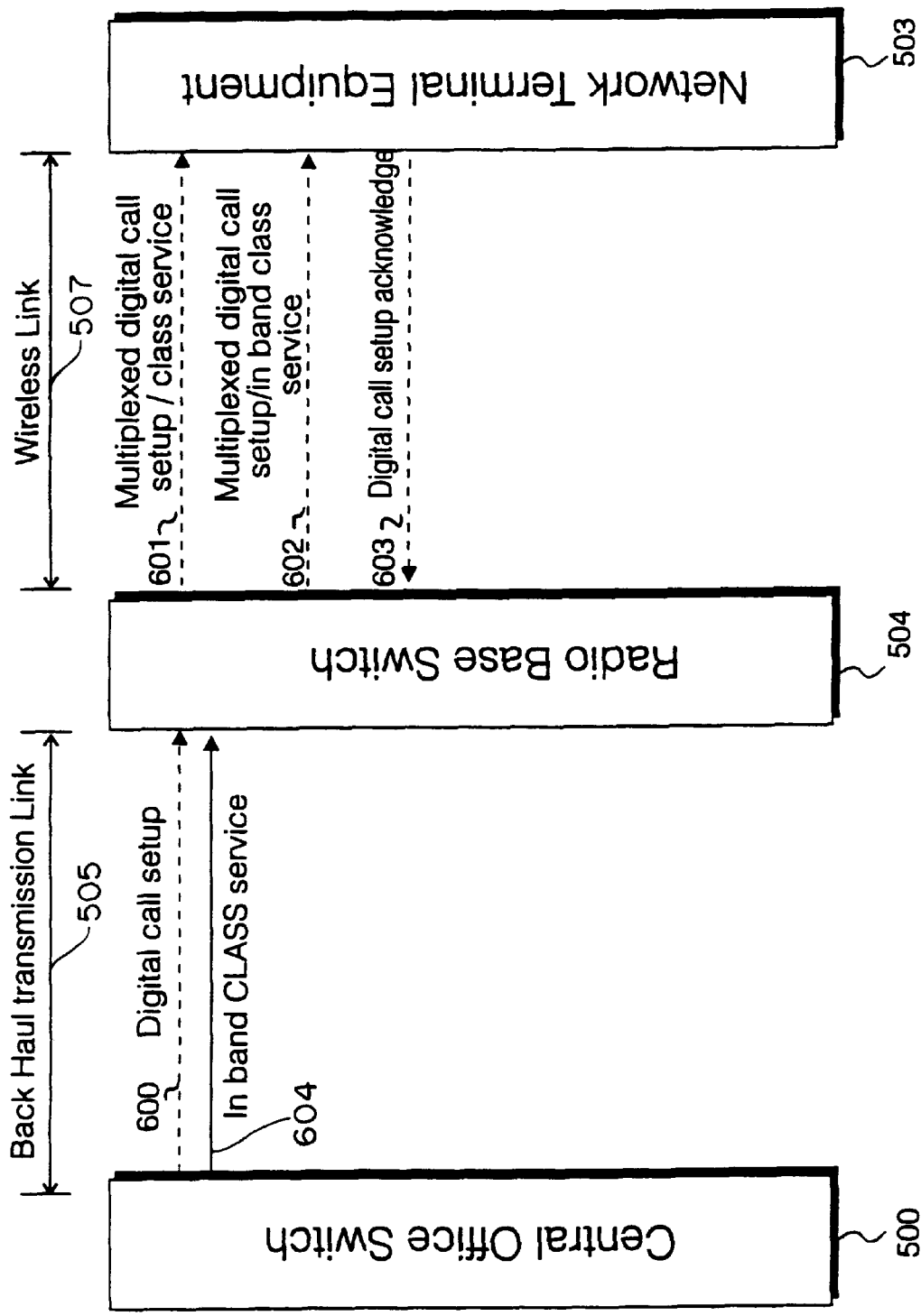
FIG. 6 illustrates schematically a signaling sequence according to a specific implementation of the present invention in which in band service signaling is digitally multiplexed with call set up signaling and transmitted from a radio base station to a network terminal equipment.

A sequence of events according to the specific implementation is illustrated schematically in FIG. 6 herein. In step 600, the digital call set up signals and in band CLASS service signals 604 are transmitted by the central office switch 500 along back haul transmission link 505 and arrive at radio base station 504 substantially simultaneously. At radio base station 504, the CLASS service signal is digitized and multiplexed with the digital call set up signal prior to transmission across the digital wireless link. Reliable communication of the multiplexed digital signal between radio base station 504 and network terminal equipment 503 may take an indeterminate time, typically of the order of tens of milliseconds, but potentially up to the order of a few seconds. Whilst reliable communication is being achieved over the wireless link 507, in band service signals continue to arrive at the radio base station 504, and hence before call set up is achieved, these in band signals are buffered or stored at radio base station 504 and may be delayed until reliable communication over the wireless link is achieved. However, on receipt of the reliably communicated multiplexed digital signal, the network terminal equipment may recover the digital call set up signal and in band CLASS service signals in preserved time relationship to each other, so that call set up signals can be sent to subscriber handset 501 from the network terminal equipment 503 before, or substantially simultaneously with sending of analog CLASS service signals to the subscriber handset.

Figure 7:
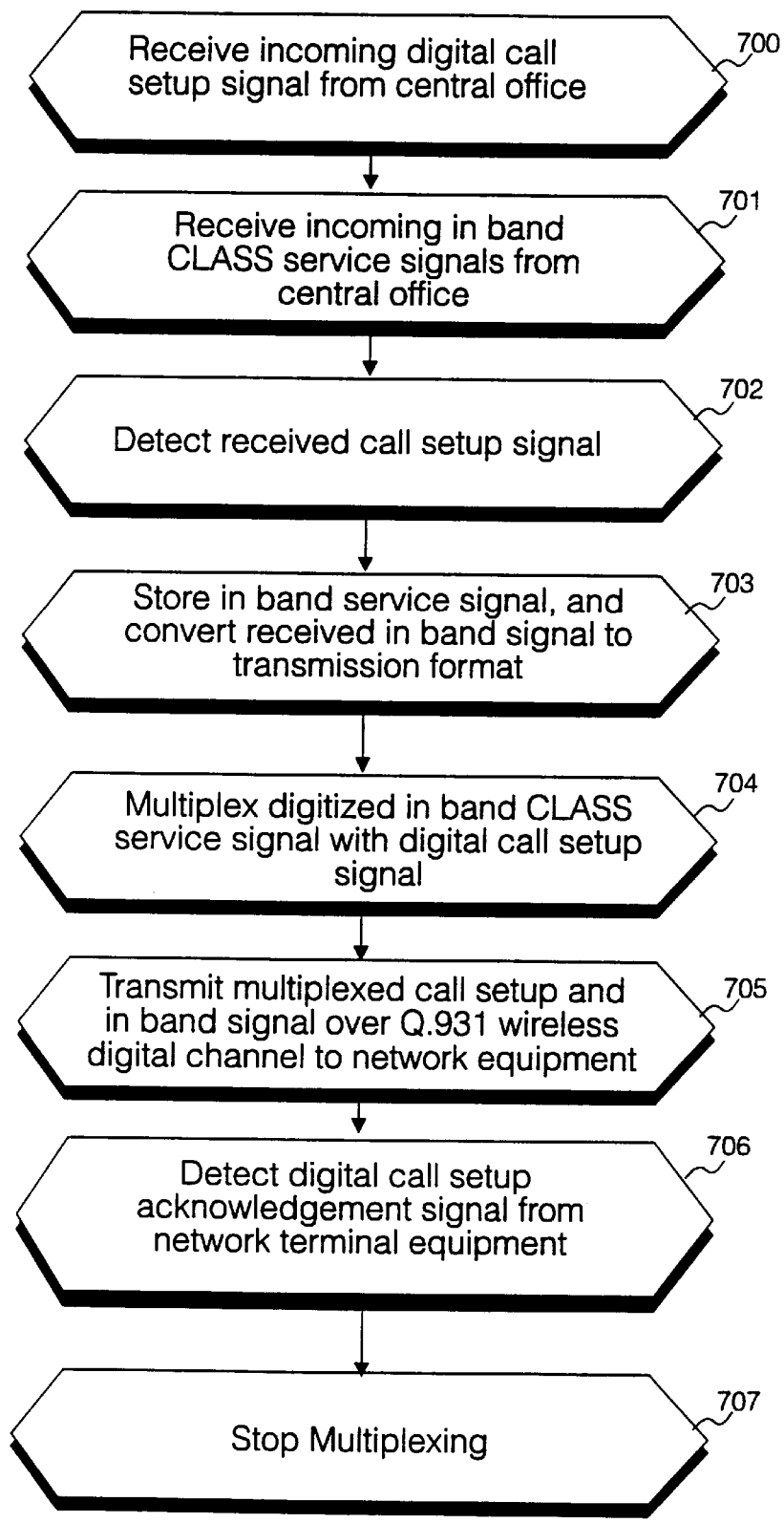
FIG. 7 illustrates schematically a method of operation of a radio base station configured in accordance with the implementation.

Referring to FIG. 7 herein, there is illustrated schematically a process carried out at base station 504 according to the specific implementation. In step 700, digital call set up signals are received from the central office switch 500, along with incoming in band CLASS service signals in step 701. On detection of a received digital call set up signal in step 702, received in-band CLASS signals are converted to digitized format suitable for storage or buffering at the base station 504 in step 703 and may be delayed by storing or buffering and then multiplexed with the digital call set up signals in step 704. The multiplexed call set up and in band service signal is transmitted over wireless link 507 according to the air interface transmission protocol, e.g. Q931 to the network terminal equipment 503. Storage and multiplexing of the digital call set up signal and the in band CLASS service signal preserves the timing relationship between the call set up signal and the in band signal throughout the indeterminate length delay experienced in traversing the wireless link 507. On receipt of the multiplexed digital signal, network terminal equipment 503 transmits a call set up acknowledgment signal over wireless link 507, which is received by the base station 504. On detection of the call set up acknowledgment signal in step 706, the base station 504 ceases to store signals from the incoming out of band and in band channels received over back haul transmission link 505, and re-transmits them over wireless 507 without significant delay.

Figure 8:
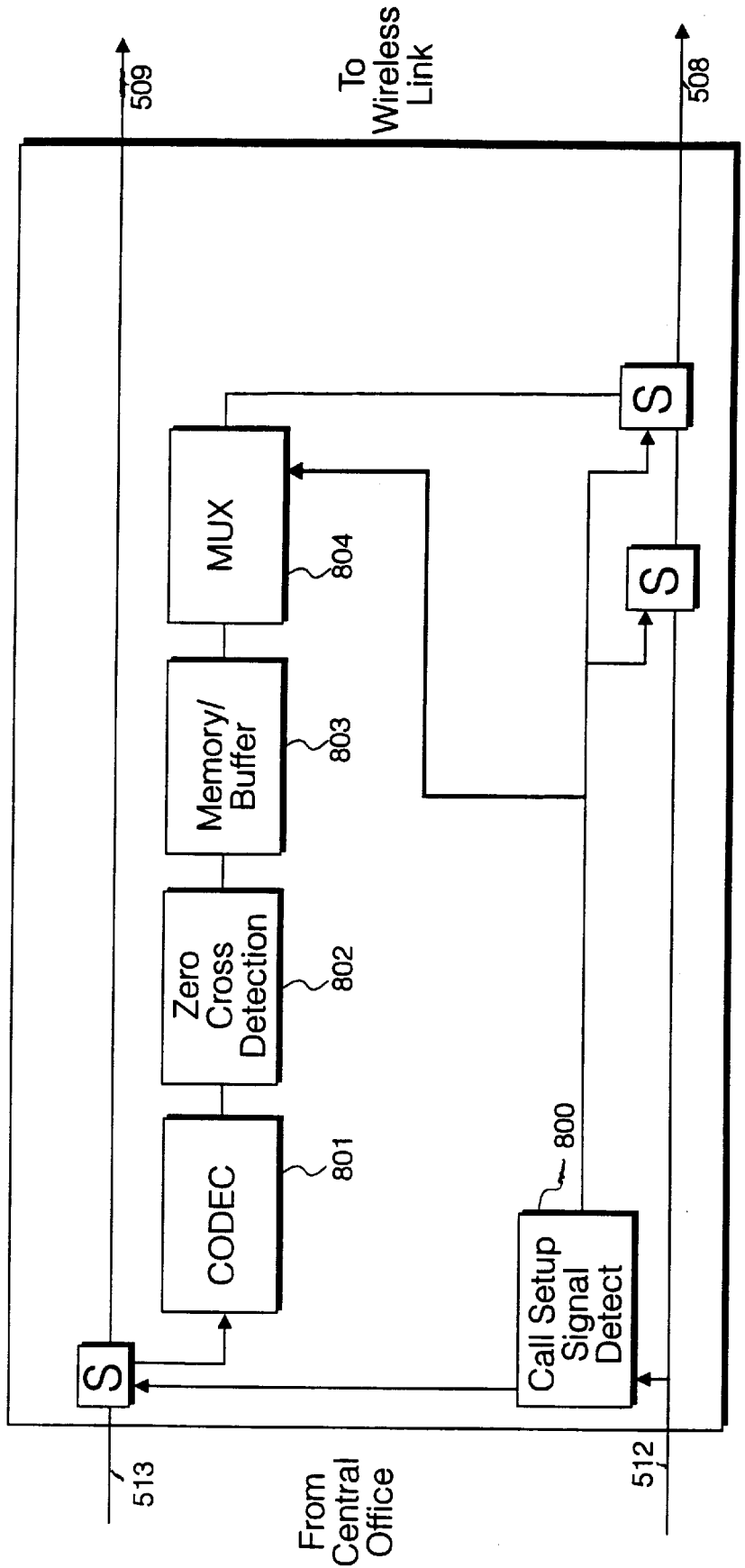
FIG. 8 illustrates schematically a configuration of a radio base station in terms of functional elements supporting the specific implementation of the present invention.

Referring to FIG. 8, herein there are illustrated functional elements of a base station 504 modified in accordance with the specific implementation. Functional elements provided in the base station include a call set up signal detection means 800 for detecting an incoming digital call set up signal; a codec 801 for decoding in band CLASS service signals received from central office switch 500; a zero crossing detector 802 for detecting zero crossings in the decoded in band signal; a digital buffer 803 for delaying the in band signals; and a multiplexer 804 for multiplexing the digital call set up signals with the digitized in band CLASS service signals, the multiplexer means forwarding the multiplexed digital call set up and digitized in band CLASS service signals over wireless link 507.

The functional elements described relation to FIG. 8 may be carried out by modification of coded control mechanisms within the radio base station 504.

Within a network terminal equipment modified in accordance with the specific implementation, is provided a demultiplexer receiving the multiplexed digital signal comprising the digital call set up signal and the digitized in band CLASS service signal, the demultiplexer inputting the demultiplexed digitized in band class service signals to a digital to analog converter, which operates to reconstitute the in band CLASS service signals to analog format, typically for example a 100 Hz, 1200 Hz frequency shift keyed (FSK) square wave signal, which is forwarded to the subscriber handset along an analog portion of the subscriber line in a substantially preserved time relationship with the digital call set up signals.

What is claimed is:

1. A method of providing services in a telecommunications network having at least first and second transmission links, each of said first and second transmission links having a voice band channel and an out-of-band digital channel, and said second transmission link being a fixed wireless access link, said method comprising the steps of:

receiving service signals describing said services on said voice band channel of said first transmission link;

receiving a call set up signal on said digital channel of said first transmission link;

transmitting said call set up signal over said digital channel of said wireless link;

delaying said service signals for a delay period; and transmitting said service signals in a predetermined timing relationship with said call set up signal over said digital channel of said wireless link after said delay period.

2. A method of operating a radio base station apparatus of a fixed wireless access telecommunications system, for delivering services carried in a voice band channel of a subscriber line, said method comprising steps carried out at said radio base station of:

detecting a call set up signal received on a digital path of said subscriber line;

transmitting said call set up signal over a digital channel of a wireless link of said subscriber line;

receiving a set of service signals on said voice band channel of said subscriber line;

storing said service signals at said base station for a delay period; and after said delay period, transmitting said service signals in a predetermined timing relationship with said call set up signal over said digital channel of said wireless link of said subscriber line.

3. In a fixed wireless access radio base station of a telecommunication system, a method of delivering service signals carried in a voice band channel of a subscriber line, said method comprising the steps of:

receiving digital call set up signals over a digital path of said subscriber line;

receiving said service signals over a voice band path of said subscriber line;

delaying said service signals for a delay period;

multiplexing said digital call set up signals and said service signals in a predetermined timing relationship; and transmitting said multiplexed digital call set up signals and said service signals over a digital channel of a fixed wireless access link of said subscriber line.

4. In a fixed wireless access network terminal apparatus a method of supplying service signals carried in a voice channel of a subscriber line and call set up signals carried in an out-of band channel, said method comprising the steps of:

receiving a digitized signal over a digital channel of a fixed wireless access link, said digitized signal comprising a digital call set up signal and a digitized service signal in a predetermined timing relationship;

transmitting said digital call set up signal along a digital channel of said subscriber line;

converting said digitized service signal to analog format; and transmitting said analog service signal over an analog channel of said subscriber line.

5. The method as claimed in claim 4, wherein said step of transmitting said service signal over said analog channel comprises transmitting said service signal within a voice band.

6. The method as claimed in claim 4, wherein said step of converting said digitized service signal to analog format comprises re-modulating said service signal as a frequency shift keyed signal.

7. A fixed wireless access network terminal apparatus comprising:

transceiver means capable of receiving a digital signal comprising a call set up signal and a digitized service signal multiplexed with each other in a predetermined timing relationship;

a digital to analog converter capable of converting said digitized service signal to analog service signal format;

transmission means for transmitting said analog service signal in a voice band of an analog channel of a subscriber line; and transmission means for transmitting said call set up signal in an out of band path of said subscriber line.

8. A fixed wireless access radio base station apparatus for use in a telecommunications network having a transmission link for carrying service signals in a voice band channel and a call set up signal in an out-of-band digital channel, comprising:

transceiver means capable of receiving a digital signal comprising said call set up signal and a digitized version of said service signals, said transceiver means being capable of transmitting said call set up signal and said service signals over the transmission link in a predetermined timing relationship; and data storage means capable of storing said digitized service signals;

wherein said data storage means operates to store and delay said service signals prior to transmission of said service signals over the transmission link.

* * * * *

UNITED STATES PATENT AND TRADEMARK OFFICE
CERTIFICATE OF CORRECTION

PATENT NO. : 6,115,603  
DATED : September 5, 2000  
INVENTOR(S) : Baird et al.

Page 1 of 1

It is certified that error appears in the above-identified patent and that said Letters Patent is hereby corrected as shown below:

<u>Title page,</u>  
Item [30] Foreign Application Priority Data, "971514" should read -- 9715142 --

Item [56] References Cited, U.S. PATENT DOCUMENTS, insert  
-- 5,371,781 12/1994 Ardon  
   5,636,266 6/1997 Rangansth et al. --

Item [56] References Cited, FOREIGN PATENT DOCUMENTS, insert  
9603009 2/1996 WIPO. --

<u>Column 2,</u>  
Line 4, "aft" should read -- an --

<u>Column 3,</u>  
Line 25, "kilometre" should read -- kilometer --  
Line 27, "centred" should read -- centered --  
Line 30, "fibre" should read -- fiber --

<u>Column 6,</u>  
Line 27, "abut" should read -- about --

<u>Claims,</u>  
<u>Column 10,</u>  
Line 16, "out-of band" should read -- out-of-band --  
Line 48, "out of band" should read -- out-of-band --

Signed and Sealed this

Eighth Day of January, 2002

*Attest:*

JAMES E. ROGAN  
*Attesting Officer*     *Director of the United States Patent and Trademark Office*